(12) United States Patent
Glaser

(10) Patent No.: US 7,007,238 B2
(45) Date of Patent: Feb. 28, 2006

(54) COMPUTER POINTING DEVICE HAVING THEME IDENTIFICATION MEANS

(76) Inventor: Lawrence F. Glaser, 10705 Averett Dr., Fairfax Station, VA (US) 22039

( * ) Notice: Subject to any disclaimer, the term of this patent is extended or adjusted under 35 U.S.C. 154(b) by 314 days.

(21) Appl. No.: 10/147,914

(22) Filed: May 20, 2002

(65) Prior Publication Data

US 2003/0076357 A1 Apr. 24, 2003

Related U.S. Application Data

(62) Division of application No. 09/178,738, filed on Oct. 27, 1998, now Pat. No. 6,392,671.

(51) Int. Cl.
G06F 3/00 (2006.01)

(52) U.S. Cl. ........................ 715/765; 715/741; 715/745; 715/747

(58) Field of Classification Search ................. 715/765, 715/861, 789, 741–743, 744–745, 747–748, 715/866; 345/157, 163, 765, 861, 789, 744, 345/748, 866

See application file for complete search history.

(56) References Cited

U.S. PATENT DOCUMENTS

| | | | | |
|---|---|---|---|---|
| 5,481,265 A | * | 1/1996 | Russell | 341/22 |
| 5,854,621 A | * | 12/1998 | Junod et al. | 345/158 |
| 5,900,869 A | * | 5/1999 | Higashio | 345/751 |
| 5,905,492 A | * | 5/1999 | Straub et al. | 345/744 |
| 5,917,487 A | * | 6/1999 | Ulrich | 345/765 |
| 5,943,042 A | * | 8/1999 | Siio | 345/172 |
| 5,963,206 A | * | 10/1999 | Ulrich et al. | 345/788 |
| 6,055,592 A | * | 4/2000 | Smith | 710/73 |
| 6,256,014 B1 | * | 7/2001 | Thomas et al. | 345/163 |
| 6,664,949 B1 | * | 12/2003 | Amro et al. | 345/168 |
| 6,720,948 B1 | * | 4/2004 | Martinez | 345/156 |
| 2002/0167550 A1 | * | 11/2002 | Eggen et al. | 345/838 |

* cited by examiner

Primary Examiner—Sy D. Luu
(74) Attorney, Agent, or Firm—Nixon Peabody LLP; Donald R. Studebaker

(57) ABSTRACT

A pointing device operable with a computer system having a graphical user interface. The pointing device includes a unique identifier that is associated with the pointing device, wherein a theme of the graphical user interface is automatically changed in accordance with the unique identifier. The theme may be a desktop theme. The unique identifier may also initiate a security protocol.

18 Claims, 2 Drawing Sheets

COMPUTER POINTING DEVICE HAVING THEME IDENTIFICATION MEANS

FIELD OF THE INVENTION

The present invention relates generally to computer peripheral devices such as computer input and output devices. More particularly, the present invention relates to a computer pointing device and the like that includes a unique identifier that identifies the pointing device and the particular "owner" or "owners" of the pointing device to the computer and that corresponds to, or causes, a particular theme to be displayed by the graphical user interface of the computer. The displayed theme may correspond to an overall motif of the pointing device itself.

BACKGROUND OF THE INVENTION

The graphical user interface of a conventional computer system typically offers to a user a selection of different display options which allow that user to personalize the computer system according to his or her tastes. For example, Microsoft Windows 95™ and 98™ both offer a "desktop theme" feature whereby, upon selection of a particular theme, the graphical user interface displays background colors, wallpaper, "buttons," cursor shape and the like, in accordance with a specific motif. Each theme is typically stored in the computer system as a separate file. A theme might be based, for example, on classic cars with a user's favorite automobiles shown on the so-called desktop. Further in accordance with such a theme, the buttons displayed on the display might resemble wheels, steering wheels or dashboard gauges. Other themes might be based on music groups, nature scenes, science or any arbitrary collection of colors, shapes and designs. Indeed, the number of possible themes is almost boundless.

Furthermore, it well known that the desktop of many modern computer systems can be customized by a user to alter the appearance and method of access of various applications programs on the computer system. For example, a user can reconfigure the program icons that are displayed on the computer system's desktop in a given order, to suit the preferences of the user. Similarly, some applications programs may not have any desktop icon associated therewith and thus the user must access these programs by selecting them from a menu system, such as the "start" menu commonly used in Windows 95™.

Thus, the general notion of implementing themes with a computer system's graphical user interface is known and typically is carried out by having any number of theme files preloaded in a memory storage unit of the computer system, or possibly, by downloading themes via the Internet or other network, local or wide, including perhaps a wireless network. Such themes are, by appropriately controlling the overall environment settings, then launched and displayed.

Also known are pointing devices, such as mice, that have unique designs. For example, computer mice are known that are formed in the shape of an animal or a vehicle. An example of one such device is found in U.S. Pat. No. 5,692,956, which discloses a computer mouse having a body configured to replicate a miniature automotive vehicle.

While desktop themes and uniquely designed mice are known, heretofore it has not been recognized that a desktop theme should automatically match the motif or appearance of the pointing device or mouse. That is, no one has to date suggested correlating the desktop theme of the graphical user interface of a computer with a uniquely-designed pointing device associated with that computer. Moreover, no one has to date suggested automatic correlation between, for example, a mouse and a graphical user interface of a computer system as a real time event associated with the live connection of said device.

Furthermore, it has previously been unknown that a computer peripheral, including a mouse, keyboard, printer, or other input/output device, should include an unique identifier sufficient to allow a computer system to which it is connected to modify its display or operation in accordance therewith. The unique identifier should also be sufficiently large that it can be identified from any and all other devices.

SUMMARY OF THE INVENTION

It is therefore an object of the present invention to provide a computer peripheral device having a unique identifier stored therein, which is used to automatically control one or more features of an operating system of a computer system to which the peripheral is connected.

It is a further object of the present invention to provide such a computer peripheral in which access to applications programs is controlled in response to the unique identifier contained within the peripheral.

It is yet another object of the present invention to provide a novel and unique method to identify a user to be granted access to a computer system wherein a computer peripheral containing an identifier unique to that user is connected to the computer system and is used to identify the user. That is, by associating a unique identifier with a user, it is possible to control access to a computer system. In other words, the present invention is also applicable to adding a level of security to the accessibility of a computer system.

It is a further object of the present invention to provide a unique system and method for controlling access to a computer system wherein a combination of a peripheral device and password are needed to achieve access to the system.

It is a still further object of the present invention to provide a method of easily and automatically transporting user preferences from one computer system to another computer system wherein a peripheral containing a unique identifier is detected, and such unique identifier is used to access information about the user's preferences and to modify the operation of a computer system in response thereto.

A further object of the present invention is to provide a plurality of computer peripherals, such as a pointing devices, that are marketed as collectibles, with each such peripheral having a unique identifier to facilitate identification of the peripheral to a computer system to which it is attached.

Another object of the present invention is to enhance the entertainment value received by a user from the use of a computer system by providing a computer peripheral that includes, or identifies, information associated with a specific user of the peripheral, such as that user's high game scores, game configuration information, operating system preferences and settings, etc.

It is a further object of the present invention to provide a data processing system wherein the appearance of a graphical user interface of the system is manually or automatically varied in response to a pointing device connected to the system.

Another object of the present invention is to provide a mouse driver program that reads a unique identifier stored in a mouse when connected to a live system and automatically effects an appearance change to the graphical user interface of a data processing system environment, or desktop.

Still another object of the present invention is to provide a mouse driver that can detect a live mouse exchanging event without requiring re-booting of a computer system, i.e. the mouse of the present invention is "hot-swappable."

Still another object of the present invention is to initiate a desktop theme change based on an exchanging event of any peripheral, e.g. printer, scanner, and to resolve any conflicts among desktop themes initiated by other peripherals previously connected or subsequently connected. Conflict resolution can also be in the context of harmonization, wherein the computer system controls the desktop to accommodate a newly-connected peripheral and further modify the desktop theme in accordance therewith.

These and other objects are achieved in accordance with one preferred embodiment of the present invention wherein a computer peripheral, such as a computer pointing device, is connected with a data processing system and includes a unique identifier that is processed by the data processing system and used to vary at least one of a background image, color scheme, cursor shape, wall paper design, sound association of the system, button shape and control bar color, content, design or lack thereof.

The present invention is directed to a graphical user interface theme that is associated with, or "tied to," a peripheral that is connected to a computer system. More particularly, the present invention is directed to a computer pointing device, such as a mouse, that can be uniquely identified by the computer system and, upon such identification, a particular graphical user interface (GUI) theme is displayed.

In accordance with the present invention, the mouse can have a distinctive shape, color, or overall motif that corresponds to an associated theme. That is, a mouse might be in the shape of a tree and the theme would be related to nature or, a mouse might be in the shape of a popular cartoon character and the desktop theme would feature popular images associated with that character.

In an aspect of the present invention, the computer system has a mouse driver that operates in conjunction with the unique identifier of the mouse whereby in a live system the mouse can be swapped with another mouse having a different unique identifier and whereupon the displayed graphical user interface is changed, in accordance with the new mouse attached to the computer system. In an alternative embodiment, when the mouse is first connected, the user is prompted for a password, so that changes to the graphical user interface in response to the mouse cannot be made without a password. In this manner, theft or loss of the mouse is not sufficient to permit it to be used by an unauthorized party to obtain associated information. A password, known only to the owner of the mouse, is also required. If, for example, the mouse is stolen and then connected to a computer system, a remote server can monitor this event and geographically locate the mouse's position. Of course, the password protection step can be bypassed by an appropriate software switch. The swapping can be accomplished without re-booting. That is, the mouse driver/operating system of the computer system is capable of continually, or at least periodically, monitoring the mouse connection, determining the unique identifier associated therewith and launching the appropriate theme tied to that unique identifier.

In another aspect of the invention, a user can override the automatic launching of the theme by, for example, disabling the mouse monitoring function of the mouse driver.

In still another aspect of the present invention, the connection to the mouse itself is located adjacent the mouse body, rather than at the opposite end of the mouse cable adjacent the computer, which is conventional. Through the provision of such a modular connection, the mouse can be easily removed and replaced without access to the rear of the computer system, thus facilitating the exchange of the mouse.

In another embodiment of the invention, the theme tied to a mouse's unique identifier is stored on a server remote from the user location. With such an arrangement, the appropriate theme can be accessed over a network or via the Internet. In accordance with this embodiment of the invention, a user's various pointing devices become portable from one site to another, as long as each site has an adequate mouse driver to access/read and act on the unique identifier of the mouse along with the proper cable (though a user could have a spare cable). And, by further exploiting the decentralized character of the Internet, for example, information unique to the individual owning the mouse can be transferred from a server or other computer to the computer system to which the mouse has most recently been connected. In this manner, information, such as the user's high score in a particular game, can be transferred from one system to another (with possible security provisions such as password protection), thus increasing the entertainment received from the use of the computer systems. Furthermore, a database that includes geographical location information for various computers can be accessed upon mouse connection, whereby it is possible to track where, geographically, a user or a user's device might be.

BRIEF DESCRIPTION OF THE DRAWINGS

The present invention will be more fully understood upon reading the following Detailed Description in conjunction with the accompanying figures, in which reference numerals are used consistently to indicate like elements, and in which.

DETAILED DESCRIPTION OF THE INVENTION

Figure 1:
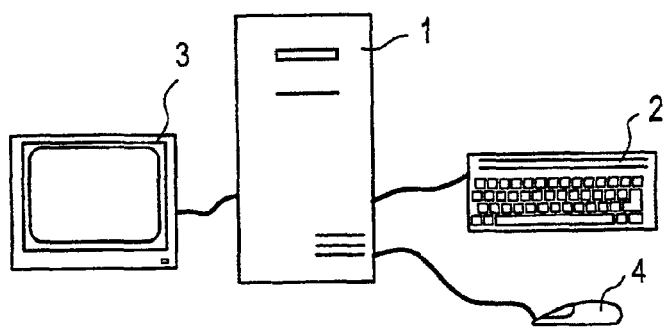
FIG. 1 depicts a computer system to which the present invention is applicable.

FIG. 1 depicts generally a computer system including a microprocessor unit 1, keyboard 2, monitor 3 and mouse 4. Under typical usage, monitor 3 displays a graphical user interface (GUI) which is operable in combination with keyboard 2 and mouse 4, or any other pointing device. Operating systems such as Windows 95™ and 98™, once installed on the microprocessor unit 1, display on the monitor a default theme, i.e., standard background color, along with conventional cursor shapes, icons, sounds and even animation. Also attached to microprocessor unit 1 may be any number of peripheral devices such as printers, scanners, display devices, pointing devices, and the like.

Figure 2A:
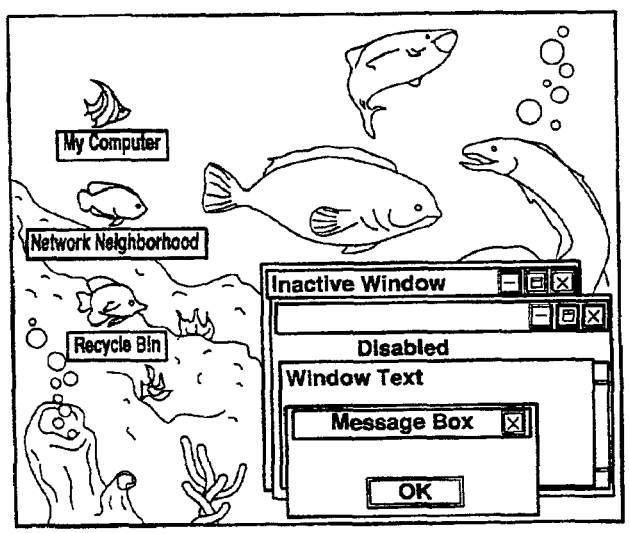
FIGS. 2(a) and 2(b) show examples of possible graphical user interface themes.
Figure 2B:
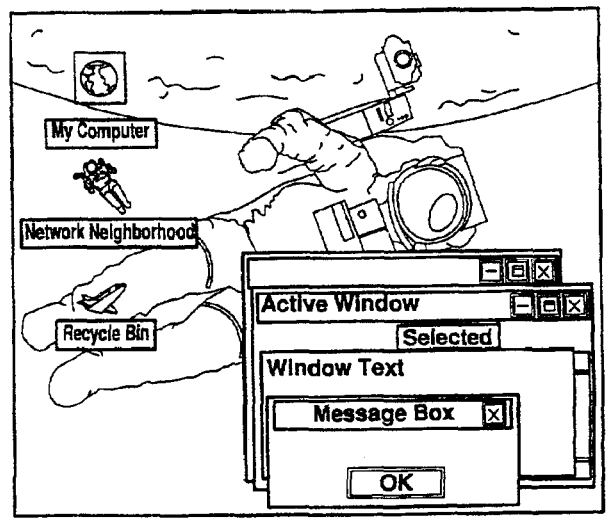

To make use of the computer more enjoyable, Windows 95™ and 98™ include a feature whereby it is possible to change the theme of the desktop. This functionality is well known and, for brevity, will not be discussed further herein. However, for clarity, FIGS. 2(a) and 2(b) show examples of two possible themes that can be displayed on monitor 3. To launch a particular desktop theme, one needs manually to click through a number of menus to reach a Desktop Theme icon at which point the desired theme file may be chosen. In accordance with the present invention, on the other hand, the theme displayed is associated with the peripheral, e.g., mouse, that is connected to the computer system.

Figure 3:
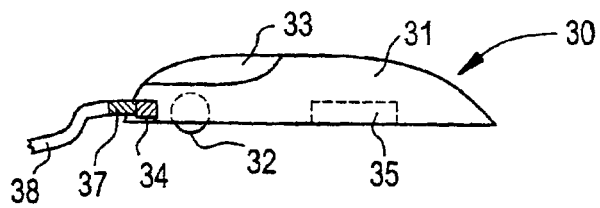
FIG. 3 shows a mouse having a semiconductor memory and connection jack adjacent the mouse in accordance with the present invention.

FIG. 3 shows a mouse in accordance with the present invention. FIG. 3 shows mouse 30 having a body 31, ball 32 and button 33 all of which are conventional. Mouse 30 also includes a modular connector 34 that corresponds to a matching connector 37 at the end of mouse cable 38. In accordance with one preferred embodiment of the present invention, mouse 30 can be disconnected and reconnected to mouse cable 38 adjacent mouse body 31. Thus, unlike conventional pointing devices having connectors adjacent a microprocessor unit, it is simple to remove one mouse 30 and exchange that mouse with another mouse 30. Cable 38 can have connectors at both ends thereof so that the conventional connection location adjacent a microprocessor unit need not be modified. Furthermore, in the most preferred embodiment, connector 37 and connector 34 are fabricated so that they may be easily disconnected by, for example, a child, such as by the use of an RJ-11 modular interconnection or the like.

Further in accordance with the present invention, mouse 30 includes identification means 35, which can be, for example, a semiconductor memory, DIP switch package, or a hardwired structure. Identification means 35 carries a unique identifier sufficient to identify to a computer system each unique individual mouse 30 that is connected to the microprocessor unit 1. In a preferred embodiment, this unique identifier corresponds to at least one desktop theme file stored in the microprocessor unit 1. The unique identifier may be a multi-bit code that is different from one mouse motif to another mouse motif.

Figure 4:
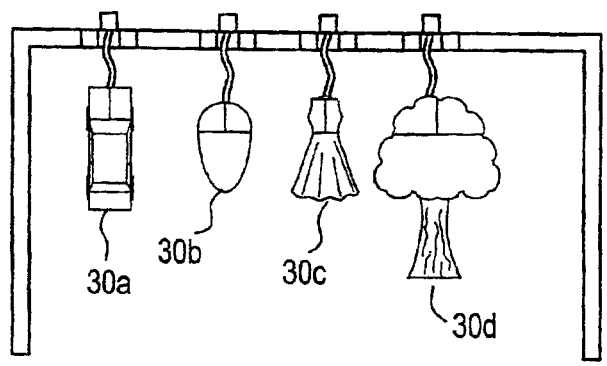
FIG. 4 shows a plurality of collectible pointing devices on a rack in accordance with the present invention.

In the present embodiment, when a computer system is turned on for the first time or a mouse 30 is exchanged at any time, a mouse driver (discussed in detail later herein) reads the unique identifier carried by mouse 30 and, if enabled, automatically implements the desktop theme associated therewith. Also, if enabled, the act of connecting the mouse 30 initiates a security protocol (not depicted in the drawings) that includes, for example, prompting for a password, or finger print or retinal scans, which then permits access to particular files, databases, programs and the like and may also permit access to telecommunication assets such as voice, data, video and satellite access. Thus, as shown in FIG. 4, a computer user can have a plurality of pointing devices 30a–30d each having a particular motif and each carrying a unique identifier that corresponds to a particular security clearance level and/or desktop theme file stored by the computer system. By tying a particular mouse with a particular theme, it is relatively simple to change desktop themes without having to understand the intricacies of the computer operating system. This is especially useful for children and for more mature users who might be required to change computer stations and who wish to operate their computer with the same theme. Not only is theme "management" simplified in accordance with the present invention, but the overall entertainment value of computer usage is enhanced. That is, an entirely new entertainment element is added to the human-computer interface when a computer peripheral has a theme, e.g., shape, color, motif, graphic, that is coordinated with a desktop theme or the graphical user interface of the computer system.

Furthermore, in accordance with the present invention, a specific application program can be automatically associated with a particular peripheral device such that the application is executed by the microprocessor unit 1 when that peripheral device is connected thereto. In this manner, for example, an application program including a given animated cartoon character is executed upon connection of a mouse having a similar animated cartoon character appearance. Thus, execution of a desired program is easily accomplished by children merely by selecting and connecting a mouse having a certain appearance.

Figure 5:
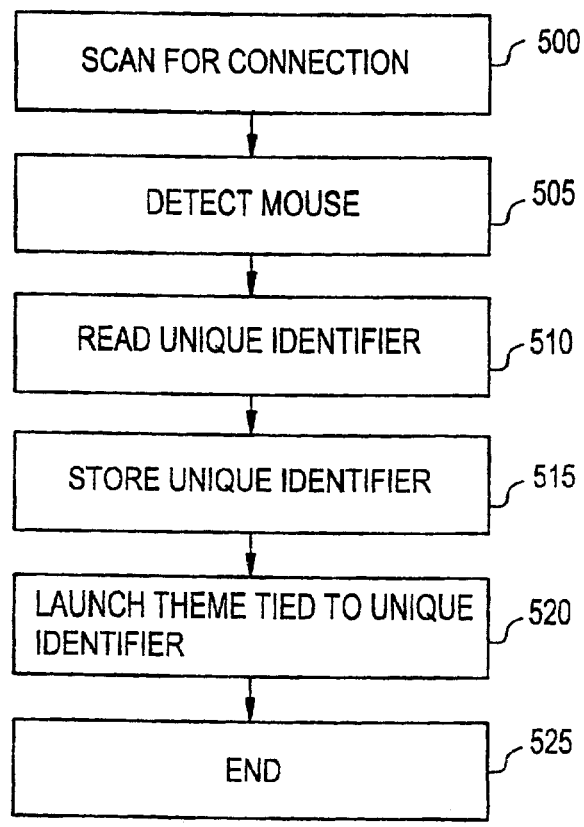
FIG. 5 is a flow chart depicting an implementation of a mouse driver in accordance with the present invention.

FIG. 5 shows a flow chart describing an exemplary mouse driver for detecting and monitoring mouse replacement in accordance with the present invention.

As will be appreciated by those of ordinary skill in the art, a driver is a program that controls a device. Typically, every device, whether it be a printer, disk drive, or keyboard, has a driver program. Many drivers, such as the keyboard or mouse drivers, are integrated with the operating system. Other devices may require a new driver to be loaded when the device is connected to the computer. In operation, a driver acts like a translator between the device and programs that use the device. Each device has its own set of specialized commands that only its driver knows. In contrast, most programs access devices by using generic commands. The driver, therefore, accepts generic commands from a program and then translates them into specialized commands for the device, or vice versa.

Referring to FIG. 5, during a cold start of a computer system, at step 500, the mouse driver scans for an input device such as a trackball or mouse. If none, a conventional computer system would abort its initialization process or wait until the required input device was present. According to an aspect of the present invention, however, if the mouse driver does not locate an expected input device, the computer system initialization process continues while waiting for the device to be connected. This aspect of the present invention allows an external input device such as a mouse or keyboard to be changed during or after the initializing or "booting up" of the computer.

At step 505 detection of a mouse takes place. Then at step 510, the unique identifier carried by the mouse is read by the driver whereupon the read unique identifier is stored in memory at step 515. The mouse driver of the present invention also includes a plurality of theme files that correspond to pointing devices that might be attached to the computer system. That is, multiple theme files are preferably included with each mouse driver, even if one mouse only is in a user's possession. Pointers to the individual theme files can be organized in, for example, a look-up table, and the unique identifier can correspond to a particular pointer. Once boot-up is complete (in the case of a cold start) the stored unique identifier is passed to the operating system at which time it is matched with the appropriate theme which is then automatically launched, as indicated by step 520. The mouse driver routine ends at step 525. The passing of the unique identifier can be accomplished in at least two distinct ways. The peripheral itself, e.g. mouse 30, can indicate its presence by, for example, raising a hardware flag that is monitored by the computer system. Alternatively, the operating system of the computer system can periodically scan for new connections and thereafter query any newly detected peripherals.

Since the present invention provides for dynamic mouse exchanging, the mouse driver routine shown in FIG. 5 is preferably run periodically, e.g., every second, upon detection of a mouse movement, some combination of the above, or any other scheme whereby the unique identifier carried by the mouse can be transmitted to the computer system in a timely manner after a mouse exchanging event has occurred. Of course, functionality can be included whereby the above-described periodic scanning of the mouse driver is disabled such that automatic theme changes do not occur even if the mouse is exchanged. Furthermore, detection of a newly added or changed computer peripheral can be performed as a result of user direction. Thus, upon changing the pointing device, the user can manually activate a program to detect the new mouse and to reconfigure the desktop theme as appropriate.

The actual software code to implement the function of the above-described mouse driver is well within the skill of one of ordinary skill in the art and, as such, is not discussed in detail herein.

In another aspect of the present invention, theme files can be stored on a server of a network, accessible directly, or via the Internet. Thus, theme files stored by the computer can be updated periodically such that all themes are accessible to anyone at any time. Accordingly, children can exchange and share pointing devices as toys or collectibles and experience the different themes associated therewith.

In still another aspect of the invention, multiple devices (peripherals) having different aspects of a similar theme or even aspects of disparate themes can be harmonized, or combined, to be displayed simultaneously on the computer desktop. In this way, sets of peripheral devices can be sold together, or separately, which when connected during the same time frame or period, display common or combined themes.

In yet another aspect of the present invention, themes can be updated by a mouse manufacturer to keep the theme current. That is, a theme is downloaded from the Internet and is changed each time, to provide further entertainment and excitement to children, for example, by updating in real-time with respect to current events, such as cartoon televison programs. As an example, if a new costume with specialized colors and designs is worn by a television cartoon character, the desktop theme changes its colors and motif to be in concert with those colors and designs.

Additionally, the unique identifier carried by the mouse need not be limited to identifying a mouse only. For instance, with the Internet updating just described, the unique identifier may also include information regarding the user of the mouse and that information could be used to access that user's favorite themes. Pull down menus can be provided within the computer operating system to provide theme management functions such as last-used theme, most-used theme, least-used theme, theme adding and deleting, disabling automatic theme changing and the like. Other user information, such as game scores, preferences, etc. can also be received by a computer system as a result of connection of a peripheral device in accordance with the present invention. In such case, this information may be stored within the device itself, or may be retrieved across a network, such as the Internet, in response to the unique identifier stored within the peripheral.

In another embodiment of the present invention, the mouse having a particular motif and unique identifier can be used to launch a computer game or any other application. Since the mouse driver periodically monitors for mouse exchanging and has the ability to store information that is ultimately used by the operating system to, in the case discussed above, launch a particular theme, then it is also possible to use the same mouse driver to launch on the computer system any application, such as a game that is sold with a specially designed mouse or pointing device.

In accordance with the present invention, all other existing functionality of the computer system and its devices would be unaffected by the implementation of the invention. That is, no functionality is impeded by the present invention's implementation.

The present invention also contemplates the use of a plurality of wireless mice that include means to determine which one, of a plurality of such mice, is active. Specifically, in such a situation, the present invention provides that each mouse includes a power source, e.g., a battery, or solar panels, that is activated only by a manual switch, or mercury switch that is activated when the mouse is oriented for use, as opposed to being stored on a rack, as explained earlier. Other differentiation implementations include proximity sensors and activity sensors. Of course any combination of the aforementioned implementations may also be used to make this determination.

Finally, as computer memory and microprocessor technology advances, the amount of space necessary for each is significantly reduced. Indeed, now and even more so in the future, an entire computer is disposed on a single semiconductor substrate. These technologies are relevant to the present invention in that these ever smaller computers will be able to be mounted, for example, in a mouse in accordance with the present invention. Thus, not only can the mouse of the present invention be used to initiate desktop theme changes or security checks, the mouse can be used to backup whole files, applications, databases and the like so that when the mouse is connected to a different computer, the theme and environment associated with that mouse, along with the user's computing necessities, become immediately available on the new computer.

There will be other advantages such as co-processing, co-storage, enhanced performance, enhanced redundancy, shared tasking, multi-processing, enhanced user portability and mobility.

The present invention has been described in terms of presently preferred embodiments so that an understanding of the present invention can be conveyed. The present invention should therefore not be seen as limited to the particular embodiments described herein. Rather, all modifications, variations, or equivalent arrangements that are within the scope of the attached claims should be considered to be within the scope of the invention.

What is claimed is:

1. A peripheral device operable with a computer system having a graphical user interface, the peripheral device comprising:
    transmitting means for transmitting data between the peripheral device and the computer system; and
    identification means for presenting to the computer system, via the transmitting means, a unique identifier associated with the peripheral device, wherein a security protocol is initiated by the computer system based on the unique identifier presented by the transmitting means to the computer system.

2. The peripheral device of claim 1, wherein the means for transmitting data between the peripheral device and the computer system comprises a cable.

3. The peripheral device of claim 2, wherein the cable is modularly coupled with the peripheral device.

4. The peripheral device of claim 1, wherein the means for transmitting data between the peripheral device and the computer system comprises an optoelectronic transmitter and receiver.

5. The peripheral device of claim 1, wherein the means for transmitting comprises an electromagnetic transmitter and receiver.

6. The peripheral device of claim 1, wherein the identification means comprises a semiconductor memory which is disposed in the peripheral device.

7. The peripheral device of claim 6, wherein the semiconductor memory is non-volatile.

8. The peripheral device of claim 6, wherein the semiconductor memory is modifiable.

9. The peripheral device of claim 1, wherein the unique identifier corresponds to a pointer stored in a look-up table that is stored in the computer system.

10. The peripheral device of claim 1, wherein the unique identifier further includes user data.

11. The peripheral device of claim 10 wherein the unique identifier further includes user preferences.

12. The peripheral device of claim 1, wherein the security protocol includes.

13. The peripheral device of claim 1, wherein the unique identifier is identifiable by an operating system of the computer system.

14. The peripheral device of claim 13, wherein the unique identifier is automatically identifiable by the operating system.

15. The peripheral device of claim 13, wherein the unique identifier can be masked from the computer system.

16. The point device of claim 1, wherein the peripheral device is wireless.

17. The peripheral device of claim 16, wherein only a single wireless peripheral device of a plurality of wireless peripheral devices is active at any one time.

18. A computer system, comprising:

a plurality of peripheral devices connected to the computer system, each of said devices having a unique identifier associated with a particular aspect of a unique desktop theme, said plurality of peripheral devices operable in combination to display said unique desktop theme.

* * * * *